July 31, 1962  J. A. AVTGES ET AL  3,047,370
TRANSPARENT SODA LIME CARTRIDGE
Filed July 28, 1959
FIG. 1.
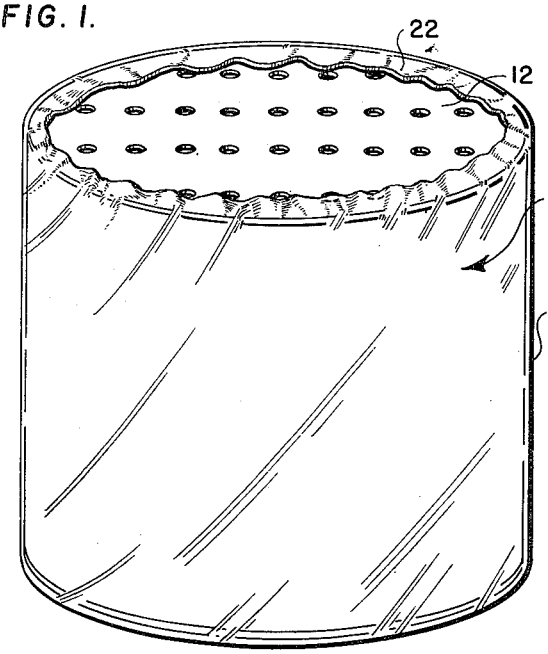
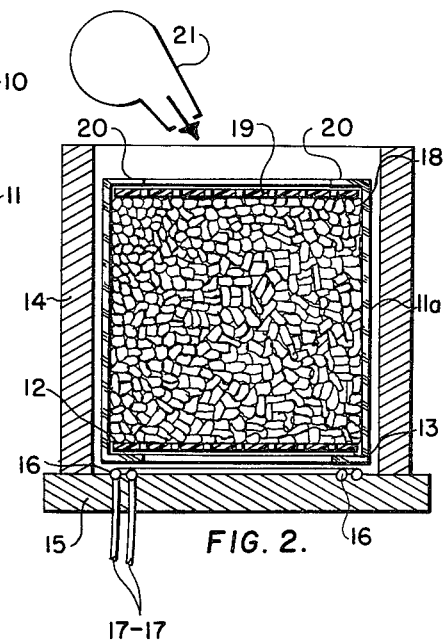
FIG. 2.
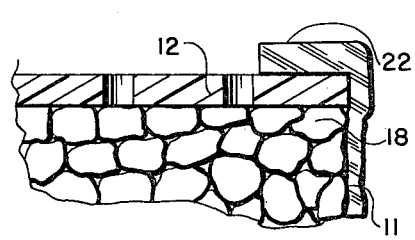
FIG. 3.
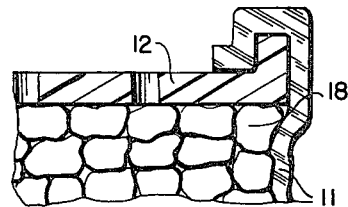
FIG. 4.

3,047,370
TRANSPARENT SODA LIME CARTRIDGE

James A. Avtges, Watertown, John W. Harrison, Winchester, and Robert G. Shaver, Concord, Mass., assignors to W. R. Grace & Co., Cambridge, Mass., a corporation of Connecticut
Filed July 28, 1959, Ser. No. 830,072
3 Claims. (Cl. 23—252)

This invention relates to rebreathing anesthesia apparatus and particularly to a disposable soda lime cartridge suitable for use in rebreathing anesthesia.

In rebreathing anesthesia, the carbon dioxide which the patient exhales, must be removed from the gas stream. This is done by continuously passing the entire stream of gas through a material which is an effective absorbent of carbon dioxide and then returning the purified stream to the intake side of the rebreathing mask.

Soda lime, which is an effective absorbent of acidic gases, is the absorbent which is most commonly used. Briefly, the absorbent assembly of a rebreathing anesthesia machine consists of a pair of opposed pressure plates. The top plate is provided with an inlet orifice through which the air exhaled by the patient passes into the absorbent assembly; the bottom plate is provided with an exit passage which is connected to the inlet side of the rebreathing mask. Between the two plates a "cartridge" filled with soda lime granules is placed. The pressure plates are equipped with gaskets so that a gas tight assembly is formed when the apparatus is clamped together. Sometimes a deck of cartridges is used (usually two).

Many anesthetists use "indicator limes" which change color as the absorbent capacity of the lime approaches exhaustion and demand that the walls of the cartridge be transparent in order that they may see any color change. Others demand transparency, feeling that they must observe the condition of the line from moment to moment. In any event, a transparent container has become the most desirable form of cartridge. At the present time, these cartridges are tubes formed of cellulose acetate-butyrate, of polystyrene or polymethylmethacrylate or even glass. Their ends are closed by perforated covering plates.

When the anesthetist wishes to charge the rebreathing apparatus, he removes the top plate from one of the cartridges and pours granules of soda lime into the cartridges until the cylinder is full. The bulk package from which the anesthetist fills the cartridge is usually a five gallon pail provided with a flexible polyethylene pouring spout through which the granules may be discharged.

Despite many ingenious formulations designed to increase the abrasion resistance of soda lime, and despite earnest efforts of the manufacturer to remove all traces of dust from the lime as it is packaged, transport in a bulk container does cause abrasion and does create dust. The caustic dust is a hazard and under no circumstances should it reach the lungs of the patient. Removing all traces of dust from the newly charged cartridge is a time-consuming step which the anesthetist earnestly wishes to avoid.

Quite recently a soda lime composition with most unusual properties has been introduced. The new lime is an otherwise conventional soda lime to which from about 1% to 3% of a relatively high molecular weight sodium carboxymethylcellulose has been added. As soon as this salt is mixed with the lime, the water contained in the lime causes it to hydrate. Shortly, instead of free flowing granules, the mass consolidates into a coherent plastic, moldable, and completely dustless mass. Surprisingly, the absorptive capacity of the lime for carbon dioxide is in no way affected; it retains the same absorbent capacity as prior to the addition of the sodium carboxymethylcellulose.

We have discovered a way of initially packaging such a soda lime and of producing a cartridge having strong, transparent walls, the ends of which overlie and cling to the end plates in a gas-tight manner. The new cartridge is so inexpensive that it may be discarded after use. Not only is all dusting avoided, but the container is completely transparent and is immediately ready for use. All loading of cartridges or handling of soda lime in the hospital is eliminated.

It will become apparent that conventional granular limes can be packed in our new cartridge by our new method, but the use of the utterly dustless, plastic lime, by eliminating all dust hazard, gives so great an improvement that the use of conventional limes is not recommended.

Our invention may best be understood by reference to the drawings in which:

FIGURE 1 is a perspective view of our improved transparent walled soda lime cartridge.

FIGURE 2 is a vertical cross section through the cartridge assembly apparatus showing the partly assembled cartridge and a diagrammatic representation of the heat shrinking step which seals and locks the cartridge into a compact assembly.

FIGURE 3 is a partial cross section showing the intersection of the side wall and the end wall of the cartridge.

FIGURE 4 is a partial cross section showing a variant of the intersection of the side wall and the end wall of the cartridge.

Referring to FIGURE 1, the transparent wall 11 of the cartridge 10 is formed of a tubular film of an oriented plastic substance capable of shrinking materially when it is heated. Suitable materials are for example, shrinkable, oriented saran, polyethylene terephthalate and oriented rubber hydrochloride. We prefer, however, to use a film made of polyethylene which has been irradiated and subsequent to its irradiation has been biaxially stretched. A film of this material from 0.0015 to 0.003 of an inch thick is sufficiently gas proof, tough and strong and if heated to about 205° F. will shrink to about 40% of its unheated dimensions. If restrained from shrinking, very high pressures are developed. Shrink energies in excess of 100 lbs. per square inch of cross-section to 300 lbs. per square inch of cross-section are often observed.

In preparing the cartridge, an end plate 12 is inserted in a tube of the suitable film 11a, so as to leave a skirt extending beyond the end plate of possibly an inch to an inch and a half in depth. The material from which the perforated end plates are formed may be anything that has sufficient rigidity to hold the mass in place and is sufficiently perforated or reticulated to permit unimpeded gas flow. Punched, laminated plastic discs, molded plastic end plates having paper discs, or even discs of wire screening (if the cut ends of the wire are surrounded with a protective band) have been found to be equally useful.

The skirt is then folded against the end plate as shown at 13 and the tube and end plate are placed in a cylindrical mold 14. The proper quantity of soda lime 18 admixed with the sodium salt of carboxymethylcellulose is then placed in the mold 14. Mold 14 is closed by bottom plate 15 which is provided with resistance wire rings 16—16 on its top surface adjacent its inner periphery. Rings 16 are connected by conductors 17—17 to a proper energizing circuit (not shown). A second perforated end plate 19 is laid inside the film and on the soda lime, again leaving a skirt extending above the top end plate from an inch to an inch and a half in length which is folded over at 20 onto plate 19 as before. At this moment, the rings 16 of resistance wire which occupy the peripheral portion of the bottom of the mold are electrically energized and rapidly reach film-shrinking temperatures. At the same time, a blast of hot air from nozzle 21 is turned into the top of the mold. The heated ring at the bottom and the hot air blast hitting the infolded skirts shrinks them, turning each skirt into a narrow thickened infolded annulus (shown at 22 in FIGURE 1 and in more detail in FIGURE 3) which surrounds the periphery of the end discs and overlies their exposed outer surface. The cylindrical wall of film is then heated very briefly in order to pull the wall into a drum tight condition and compact permanently the charge of soda lime. This last step brings the wall so tightly against the soda-lime charge that the film wall 11 intermeshes with the granules of the charge of soda lime 18.

In some instances, it is desirable to increase the strength of the seal between the end plate 12 and side wall 11. This may be accomplished by placing an adhesive, preferably a rubber adhesive such as Pliobond—a product of Goodyear Tire and Rubber Company between the film of the side wall and the end plate in the area of overlap or by providing the end plate with an upstanding lip around the periphery thereof as shown in FIGURE 4.

Although we consider the use of a mold the best and most expeditious way of practicing our process, its use is not strictly necessary. The film is strong enough to permit molding the charge within the tube without external support. If a mold is not used, then each skirt is shrunk by a hot blast.

The dimensions of these canisters depend ultimately upon the tidal volume of gas in the respiration of the average adult. This is usually considered to be about 500 cc. Good design requires that the total void volume in the cartridge be capable of receiving a volume of gas approximately equal to or exceeding the tidal volume.

With such values of void volume, the exhaled gas can remain in contact with the soda lime long enough for the entire absorption cycle to take place. With low void volumes, some exhaled gas can be pushed through the absorption bed before absorption of carbon dioxide is complete.

The mesh size of the soda lime granules is important not only for achieving low pressure drops through the absorption bed, but to prevent the formation of channels through which gas can pass too rapidly to complete the absorption cycle. The mesh size of the soda lime granules should be between about 4 and 14 mesh. If the mesh size is less than 4, channeling can occur; whereas, if the mesh size is greater than 14, the pressure drop across the absorption bed may become excessive. It is preferred to adjust the absorption bed diameter and the granule size to maintain a pressure drop as low or lower than about 1 centimeter of water at a flow rate of 50 liters of anesthesia gas per minute. This condition is usually brought about if the diameter of the absorption bed lies between 4 and 6 inches and the height of the bed is also between 4 and 6 inches, and if the size of the granules lies between 6 and 14 mesh.

One of the difficulties with rigid walled containers has been that channeling of the gas between the container walls and the absorbent granules has been difficult to avoid. Wall channeling is due to a lack of intermeshing between the surface of the rigid canister and the surface of the granules.

Various expedients have been tried to overcome the wall effect, one of which is to pack the absorbent around a wire cone. The path along the wall is made much longer by this expedient and some compensation for wall effect has been achieved.

It is a major advantage of this invention that wall channeling is largely eliminated. The film wall, being flexible and tightly shrunk presses against the soda lime charge so closely that no channels exist through which gas can flow. In a very real sense, the boundaries of the granules and the boundary of the film wall inter-mesh. Hence, compensating devices such as, for example, the wire cones are no longer required. The anesthetist can now be sure that all carbon dioxide is scoured from the gas stream.

The cartridges are packed and shipped to the hospital in suitable containers of appropriate dimensions similar in mechanical respects to a one pound vacuum packed coffee can. In the hospital, as soon as the can tear-strip is removed, the cartridge is ready for insertion in the anesthetic apparatus.

We claim:

1. A non-channeling, disposable, gas absorbent cartridge for re-breathing apparatus comprising a charge of soda lime granules surrounded by a transparent wall formed from a biaxially oriented polymeric membrane possessing the properties when heated to 205° C. of shrinking to 40% of its unheated dimensions and exhibiting shrink energy of from 100 to 300 p.s.i., said soda lime being made dustless by the addition of from 1 percent to 3 percent of sodium carboxymethylcellulose, perforated end-plates positioned on top of and at the bottom of the charge, said end-plates being secured in position by a thickened annulus of the wall material surrounding the periphery of the plates and overlying a portion of their exposed outer surface adjacent the periphery, said membrane throughout its wall area being in tight contact with the boundary granules of the soda lime charge and conforming to the external configuration of each boundary granule, the surface enclosure of the boundary granules thereby preventing gas channelling between the absorbent charge and the wall.

2. A cartridge as claimed in claim 1 wherein the surrounding transparent membrane is formed from irradiated, oriented and heat-shrinkable polyethylene.

3. A cartridge according to claim 1 wherein the particle size of the soda lime granules ranges between 4 and 14 mesh.

References Cited in the file of this patent

UNITED STATES PATENTS

| | | |
|---|---|---|
| 1,737,532 | Allen | Nov. 26, 1929 |
| 1,757,530 | Keim | May 6, 1930 |
| 1,781,664 | Rockwell | Nov. 11, 1930 |
| 1,950,502 | Madan | Mar. 13, 1934 |
| 2,222,882 | Shames | Nov. 26, 1940 |
| 2,470,214 | Egan | May 17, 1949 |
| 2,711,346 | Irwin et al. | June 21, 1955 |
| 2,745,419 | Slingerland | May 15, 1956 |
| 2,792,295 | Wright | May 14, 1957 |
| 2,816,061 | Doerr et al. | Dec. 10, 1957 |
| 2,848,309 | Hay | Aug. 19, 1958 |